US010394448B2

(12) United States Patent
Wu

(10) Patent No.: US 10,394,448 B2
(45) Date of Patent: Aug. 27, 2019

(54) DIRECTION-BASED TEXT INPUT METHOD, SYSTEM, AND COMPUTER-READABLE RECORDING MEDIUM USING THE SAME

(71) Applicant: Wistron Corporation, New Taipei (TW)

(72) Inventor: Shin-Jan Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 47 days.

(21) Appl. No.: 15/627,364

(22) Filed: Jun. 19, 2017

(65) Prior Publication Data

US 2018/0260111 A1 Sep. 13, 2018

(30) Foreign Application Priority Data

Mar. 7, 2017 (TW) ............................ 106107320 A

(51) Int. Cl.

| | |
|---|---|
| ***G06F 3/0488*** | (2013.01) |
| ***G06F 3/0481*** | (2013.01) |
| ***G06F 3/01*** | (2006.01) |
| ***G06F 3/023*** | (2006.01) |

(52) U.S. Cl.
CPC .......... *G06F 3/04886* (2013.01); *G06F 3/018* (2013.01); *G06F 3/0237* (2013.01); *G06F 3/04883* (2013.01)

(58) Field of Classification Search
CPC combination set(s) only.
See application file for complete search history.

(56) References Cited

U.S. PATENT DOCUMENTS 6,809,725 B1 * 10/2004 Zhang ..................... G06F 3/018 345/171
8,395,536 B2 3/2013 Tung et al.
2004/0004558 A1 * 1/2004 Fux ......................... G06F 3/018 341/22
2007/0040813 A1 * 2/2007 Kushler ................ G06F 3/0237 345/173

(Continued)

FOREIGN PATENT DOCUMENTS

TW I397001 5/2013

OTHER PUBLICATIONS

"Office Action of Taiwan Counterpart Application," dated Dec. 28, 2017, p. 1-p. 9.

*Primary Examiner* — Rayeez R Chowdhury
(74) *Attorney, Agent, or Firm* — JCIPRNET

(57) ABSTRACT

A direction-based text input method, a system and computer-readable recording medium using the same are proposed in the disclosure. The method is applicable to a system having a display and an input device and includes the following steps. A virtual keyboard is displayed on a frame of the display, where the virtual keyboard includes multiple input sets, each of the input sets includes candidate texts, and the input sets include a current input set having current candidate texts. A first moving direction and a second moving direction of the input device respectively with respect to a first axis and a second axis are detected so as to accordingly generate an input text, where the first moving direction is associated with a selection among the current candidate texts, and the second moving direction is associated with a confirmation or a cancellation of the selected current candidate text.

29 Claims, 6 Drawing Sheets

(56) References Cited

U.S. PATENT DOCUMENTS

| | | | | | |
|---|---|---|---|---|---|
| 2008/0295036 | A1* | 11/2008 | Ikeda | G06T 11/206 | 715/848 |
| 2011/0068956 | A1* | 3/2011 | Tung | G06F 3/018 | 341/28 |
| 2013/0285914 | A1* | 10/2013 | Pasquero | G06F 3/0237 | 345/168 |
| 2014/0108993 | A1* | 4/2014 | Zhai | G06F 3/0489 | 715/773 |

* cited by examiner

DIRECTION-BASED TEXT INPUT METHOD, SYSTEM, AND COMPUTER-READABLE RECORDING MEDIUM USING THE SAME

CROSS-REFERENCE TO RELATED APPLICATION

This application claims the priority benefit of Taiwan application serial no. 106107320, filed on Mar. 7, 2017. The entirety of the above-mentioned patent application is hereby incorporated by reference herein and made a part of this specification.

TECHNICAL FIELD

The disclosure relates to a text input method, a system and a computer-readable recording medium using the same, in particular to, a direction-based text input method, a system and a computer-readable recording medium using the same.

BACKGROUND

Technological advancements to computer software and hardware have now revolutionized the application of virtual reality (VR) and augmented reality (AR). This effectively pushes VR and AR consumer market, and peripheral devices have become diverse and extensive.

In terms of input devices, commonly used keyboards and mice may require two-hand operation. Input devices specifically designed for VR and AR such as mechanical wings that simulate real wings, game weapons, climbing sticks, ski poles may require two-hand operation as well, and yet such devices may not be suitable for general text input.

SUMMARY OF THE DISCLOSURE

Accordingly, a direction-based text input method, a system and a computer-readable recording medium using the same are proposed in the disclosure, which may not only obviate additional design and manufacturing cost on hardware devices, but may also break the limitation of using two hands for text input so as to enhance user experience.

According to one of the exemplary embodiments, the proposed method is applicable to a system having a display and an input device and includes the following steps. A virtual keyboard is first displayed on a frame of the display, where the virtual keyboard includes multiple input sets, each of the input sets includes candidate texts, and the input sets include a current input set having current candidate texts. Next, a first moving direction and a second moving direction of the input device respectively with respect to a first axis and a second axis are detected so as to accordingly generate an input text, where the first moving direction is associated with a selection among the current candidate texts, and the second moving direction is associated with a confirmation or a cancellation of the selected current candidate text.

According to one of the exemplary embodiments, the proposed system includes a display, an input device, and a processing device, where the processing device is connected to the display and the input device. The processing device is configured to display a virtual keyboard on a frame of the display and to detect a first moving direction and a second moving direction of the input device respectively with respect to a first axis and a second axis to accordingly generate an input text, where the virtual keyboard includes multiple input sets, each of the input sets includes multiple candidate texts, the input sets includes a current input set having multiple current candidate texts, the first moving direction is associated with a selected current candidate text among the current candidate texts, and the second moving direction is associated with a confirmation or a cancellation of the selected current candidate text.

According to one of exemplary embodiments, the proposed computer-readable recording medium records computer program to be loaded into a processing device of a text input system to execute the steps of the proposed method.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
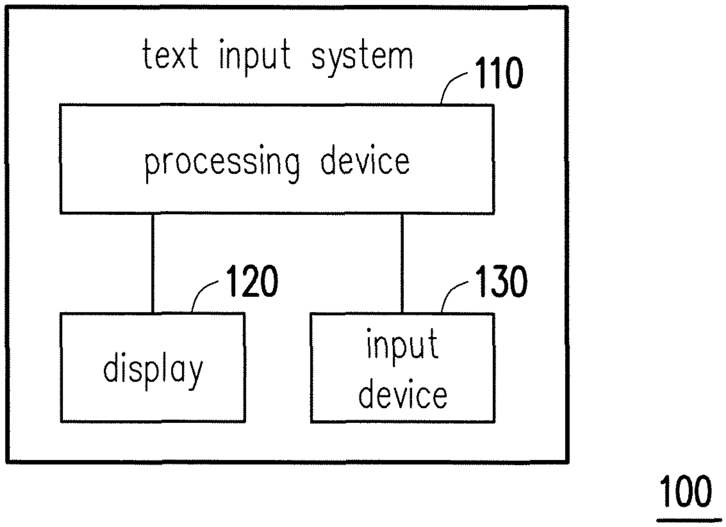
FIG. 1 illustrates a block diagram of a proposed text input system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a proposed text input system in accordance with one of the exemplary embodiments of the disclosure. All components of the text input system and their configurations are first introduced in FIG.

1. The functionalities of the components are disclosed in more detail in conjunction with FIG. 2.

Referring to FIG. 1, a text input system 100 includes a processing device 110, a display 120, and an input device 130, where the processing device 110 is connected to the display 120 and the input device 130.

The processing device 110 may be a computing device having a processor with computing capabilities such as a file server, a database server, an application server, a work station, a personal computer, a tablet computer, a laptop computer, and a video game console. The processor may be a north bridge, a south bridge, a field programmable gate array (FPGA), a programmable logic device (PLD), an application specific integrated circuits (ASIC), other similar device or a combination thereof. The processor may also be a central processing unit (CPU), an application processor (AP), a programmable general purpose or special purpose microprocessor, a digital signal processor (DSP), a graphics processing unit (GPU), or other similar device or a combination thereof. It is known by the person skilled in the art that the processing unit 110 may include a data storage device. The data storage device may be any of non-transitory, volatile, and non-volatile memories and configured to store buffered data, permanent data, compiled programming code to execute the functions of the processing device 110. Moreover, the storage device may also be external to and accessible by the processing device 110 such as an external hard drive, cloud storage, or other external recording devices.

The display 120 is configured to display frames and may be, for example, a liquid crystal display (LCD), a light-emitting diode (LED) display, or other similar devices.

The input device 130 may any device with a motion sensor that allows the user to interact with frames such as a handheld controller, a mouse, a joystick, and a trackball. The motion sensor may be an accelerometer, a gyroscope, or any sensor that is able to detect a liner movement, a direction of a linear movement, or a rotational movement of the input device 130.

In the present exemplary embodiment, the display 120 and the input device 130 may be integrated to a virtual reality (VR) headset having a display, a motion sensor, and a communication interface. The VR headset may output data sensed by the input device 130 to the processing device 110 through the communication interface either through wire or wireless transmission as known per se, and the processing device 110 would return images to be displayed on the display 120 of the VR headset 110.

In an exemplary embodiment, the processing device 110, the display 120 and the input device 130 may be three different devices, where the processing device 110 may be connected to the display 120 and the input device 130 via any wired or wireless standard. In an exemplary embodiment, the processing device 110 and the display 120 may be integrated to an electronic device having a display, and the input device 130 may be connected to the processing device 110 via any wired or wireless standard. In an exemplary embodiment, the processing unit 110, the display 120, and the input device 130 may be integrated to a single device. The disclosure is not limited in this regard.

Figure 2:
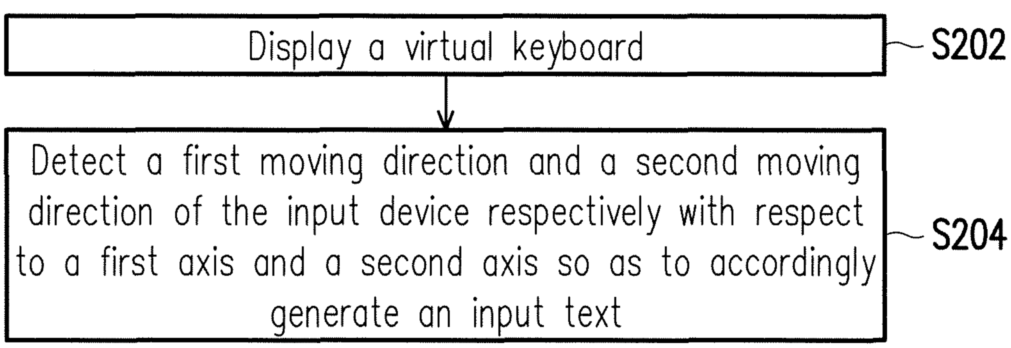
FIG. 2 illustrates a flowchart of a direction-based text input method in accordance with one of the exemplary embodiments of the disclosure.

FIG. 2 illustrates a flowchart of a direction-based text input method in accordance with one of the exemplary embodiments of the disclosure. The steps of FIG. 2 could be implemented by the text input system 100 as illustrated in FIG. 1. As indicated above, the display 120 and the input device 130 in the present exemplary embodiment are integrated to a VR headset so that the user is able to perform text input in a hands-free condition.

Referring to both FIG. 1 and FIG. 2, the processing device 110 may first display a virtual keyboard on the display 120 (Step S202). The virtual keyboard may include multiple input sets, and each of the input sets respectively includes multiple candidate texts. The arrangement of the virtual keyboard may be defined by two axes, which are referred to as "a first axis" and "a second axis" hereafter. In the present exemplary embodiment, the input sets may be sequentially arranged along the second axis, and the candidate texts in each of the input sets may be arranged along the first axis.

Figure 3:
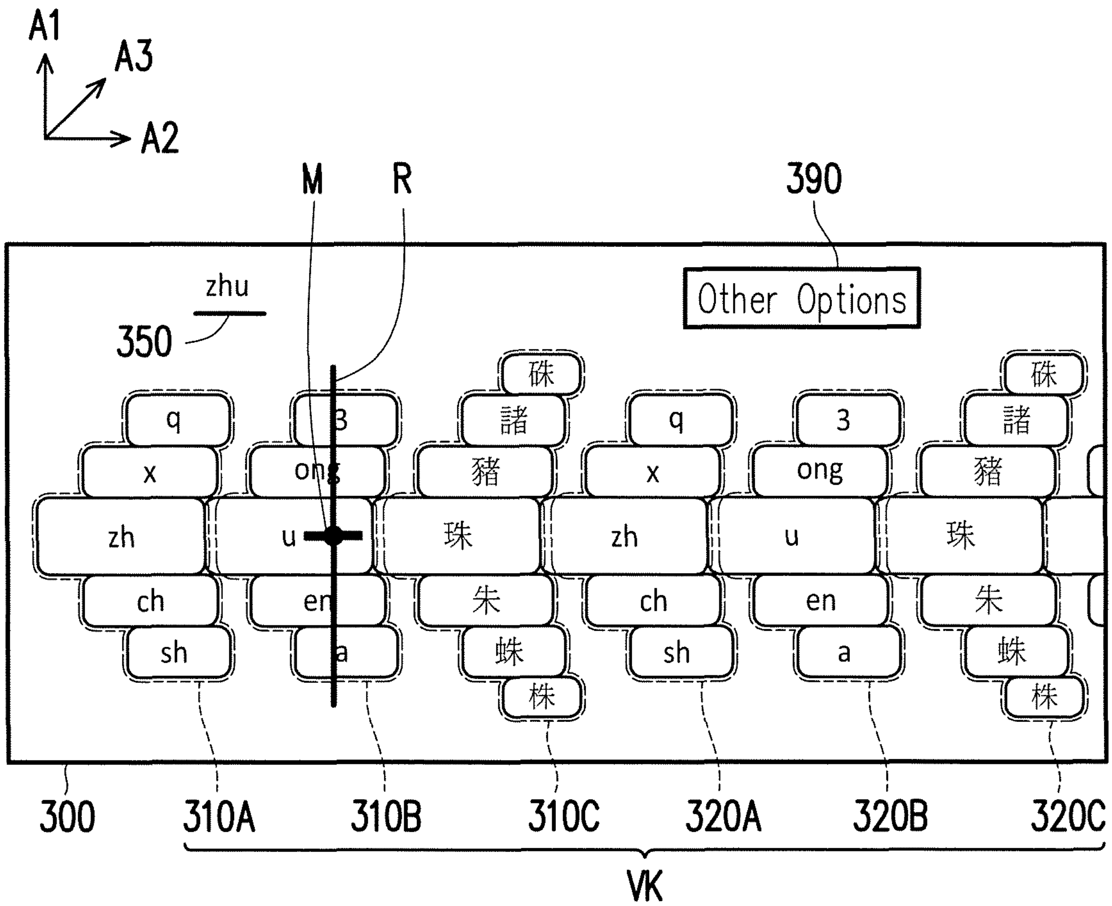
FIG. 3 illustrates a schematic diagram of a virtual keyboard in accordance with one of the exemplary embodiments of the disclosure.

To be specific, FIG. 3 illustrates a schematic diagram of a virtual keyboard in accordance with one of the exemplary embodiments of the disclosure.

Referring to FIG. 3, a virtual keyboard VK displayed on a frame 300 is a Chinese Pinyin keyboard that includes input sets 310A, 310B, 310C, 320A, 320B, and 320C. The input sets 310A and 320A are initial sets, where candidate texts therein include initials (e.g. "q", "x", "zh", "ch", and "sh") and a zero initial (may be displayed as a whitespace, not shown). The input sets 310B and 320B are final sets, where candidate texts therein include finals (e.g. "ong", "u", "en", and "a"), tones (e.g. a third tone "3"), and a combination thereof. The input sets 310C and 320C are homonym sets, where candidate texts therein include homonyms (e.g. "忠", "終", "中", "衷", "忪", and "盅"). Due to the nature of Pinyin, the finals in the final set 310B are associated with an initial selected from the initial set 310A. That is, the finals in the final set 310B are all possible finals coming after the selected initial. Moreover, the candidate texts in the input set 310C are the homonyms with the initial selected from the initial set 310A and the final selected from the final set 320A.

The input sets 310A, 310B, 310C, 320A, 320B, and 320C are sequentially arranged along a second axis A2, and the candidate texts therein are respectively arranged along a first axis A1. It should be noted that, due to the restriction of the frame size, only a part of the input sets and the candidate texts of the virtual keyboard VK are displayed on the frame 300. The processing device 110 may adjust the number of the input sets and the candidate texts to be displayed on the frame 300 based on the frame size or user settings. Moreover, the first axis A1 is a vertical axis, and the second axis A2 is a horizontal axis in the present exemplary embodiment. However, the processing device 110 may display the candidate texts in a preset curve along the first axis for aesthetic purposes. The disclosure is not limited in this regard.

In the present exemplary embodiment, the processing device 110 may display a reference line and an indicator on the frame as a basis for text input. The reference line may be displayed at a fixed position on the frame and perpendicular to the second axis. Hence, the input set located on the reference line may represent the input set that is currently selected and may be referred to as "a current input set", and all candidate texts in the current input set may be referred to as "current candidate texts" hereafter. The indicator may be displayed close to or overlapping with the reference line, and the candidate text located at the indicator is the current candidate text selected from the current input set. As an example in FIG. 3, the input set 310B located on a reference line R is a current input set, and the candidate text "u" located at an indicator M is a selected current candidate text. Moreover, the frame 300 may further include an input field 350 to display a text that has been inputted (i.e. "zh") and the selected current candidate text (i.e. "u").

Referring back to FIG. 2, after the virtual keyboard is displayed, the processing device 110 may detect a first moving direction and a second moving direction of the input device 120 respectively with respect to the first axis and the second axis to accordingly generate an input text (Step S204), where the first moving direction and the second moving direction may allow a certain degree of tolerance respectively with respect to the first axis and the second axis. Herein, the first moving direction is used to select one of the current candidate texts from the current input set and includes a positive direction and a negative direction. The second direction is used to confirm or cancel the current candidate text which has been selected and also includes a positive direction and a negative direction.

To be specific, after the virtual keyboard is displayed, the processing device 110 may consider the first-sorted input set as the current input set and display the indicator at a preset position, for example, overlapped with or close to a center point of the reference line. Moreover, the most frequently used current candidate text or any current candidate text in the current input set may be located at the indicator by default. In other words, the processing device 110 may set the current candidate text located at the indicator as the selected current candidate text while displaying the virtual keyboard.

Next, when the processing device 110 detects that the user moves the input device 120 towards the first moving direction, it may control all of the current candidate texts in the current input set to move towards a positive direction or a negative direction along the first axis so as to provide for user selection. For example, when the processing device 110 detects that the first moving direction of the input device 120 is the positive direction, it may control all the current candidate texts to move towards the positive direction so that the current candidate text arranged right after the selected current candidate text is shifted forward to where the indicator is located. When the processing device 110 detects that the first moving direction of the input device 120 is the negative direction, it may control all the current candidate texts to move towards the negative direction so that the current candidate text arranged right before the selected current candidate text is shifted backward to where the indicator is located. Moreover, when any new current candidate text moves to where the indicator is located, the processing device 110 may update such new current candidate text as the selected current candidate text.

On the other hand, when the processing device 110 detects that the user moves the input device 120 towards the second moving direction, it may not only confirm or cancel the selected current candidate text, but may also control all the input sets to move towards the positive direction or the negative direction along the second axis. When the processing device 110 detects that the second moving direction of the input device 130 is the negative direction, it may set the selected current candidate text as an input text and control all the input sets to move towards the negative direction so that the current candidate text arranged right after the selected current candidate text is shifted to the reference line for a next text selection and input. When the processing device 110 detects that the second moving direction of the input device 130 is the positive direction, it may cancel the selected current candidate text and control all the input sets to move towards the positive direction so that the current candidate text arranged right before the selected current candidate text is shifted back to the reference line to allow the user to select the other current candidate texts in the current input set.

It should be noted that, the positive direction and the negative direction with respect to each of the first moving direction and the second moving direction of the input device 120 and the relative moving relationship between the input sets and the candidate texts may be set by system default or user preference. The disclosure is not limited in this regard.

For a better understanding of Step S204, FIG. 4A-FIG. 4F illustrate schematic diagrams of generating input texts in accordance with one of the exemplary embodiments of the disclosure. It should be noted that, FIG. 4A-FIG. 4F only illustrate a part of the frame, but not the entire frame.

Figure 4A:
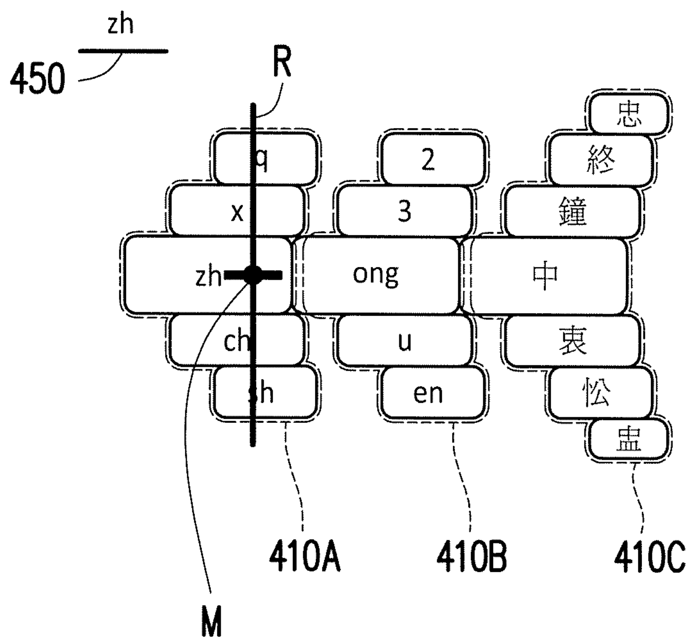
FIG. 4A-FIG. 4F illustrate schematic diagrams of generating input texts in accordance with one of the exemplary embodiments of the disclosure.

Referring to FIG. 4A, input sets herein include an initial set 410A, a final set 410B, and a homonym set 410C that are sequentially arranged. Assume that a reference line R is currently located at the initial set 410A, and an indicator M is currently located at an initial "zh". In other words, the initial set 410A is a current input set, and the initial "zh" is a selected current candidate text and displayed in an input field 450.

Figure 4B:
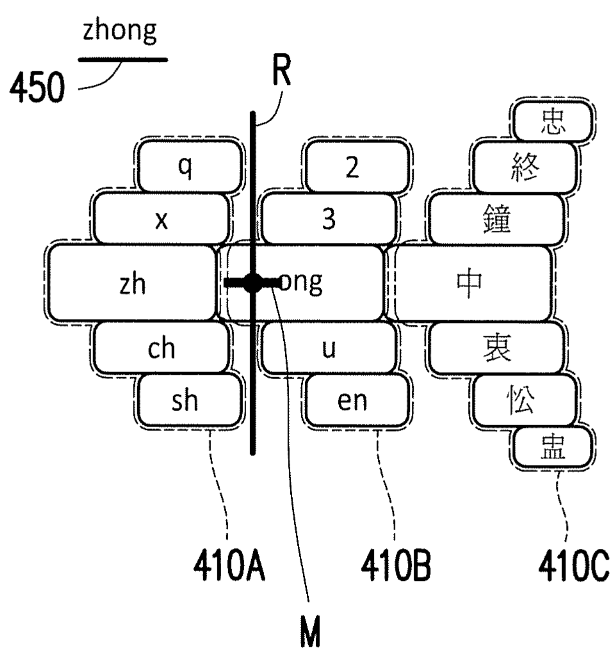

Referring next to FIG. 4B, when the processing device 110 detects that the input device 130 moves towards the left (i.e. the negative direction) with respect to a second axis A2, it may confirm that the selected current candidate text "zh" is an input text (referred to as "an initial input text" hereafter) and control all the input sets to move towards the left so that the final set 410B arranged right after the initial set 410A is then located on the reference line R. Meanwhile, since the processing device 110 has not yet detected that the input device 130 has been moved towards the first axis A1, a final "ong" located at the indicator M is the selected current candidate text and displayed in the input field 450.

Figure 4C:
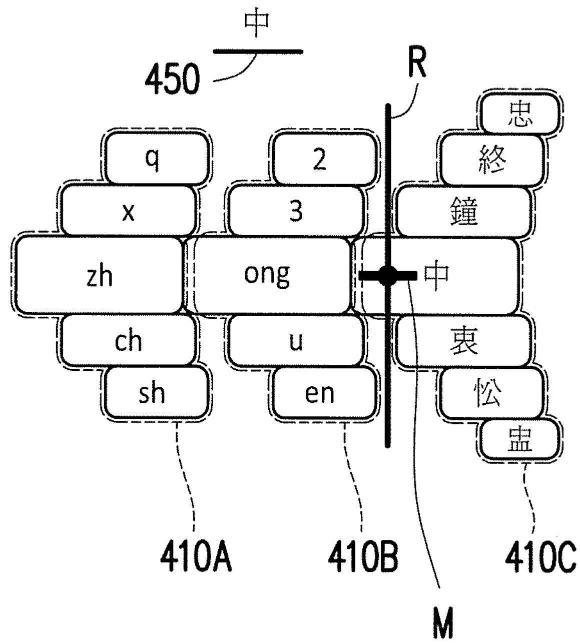

Referring next to FIG. 4C, when the processing device 110 detects that the input device 130 moves towards the left (i.e. the negative direction) with respect to the second axis A2, it may confirm that the selected current candidate text "ong" is an input text (referred to as "a final input text" and control all the input sets to move towards the left so that the homonym set 410C arranged right after the final set 410B is then located on the reference line R. All candidate texts in the homonym set 410C are homonyms with the initial input text "zh" as an initial and the final input text "ong" as a final. Since the processing device 110 has not yet detected that the input device 130 has been moved towards the first axis A1, a homonym "中" located at the indicator M is the selected current candidate text. Since the initial input text and the final input text are in the Pinyin format but not a Chinese character, after the processing device 110 obtains the selected current candidate text "中", it may convert the initial input text "zh and the final input text "ong" displayed in the input field 450 to the homonym "中". Moreover, in the present exemplary embodiment, the processing device 110 may arrange the most frequently-used homonyms close to the indicator M to minimize the user's interaction burden.

Figure 4D:
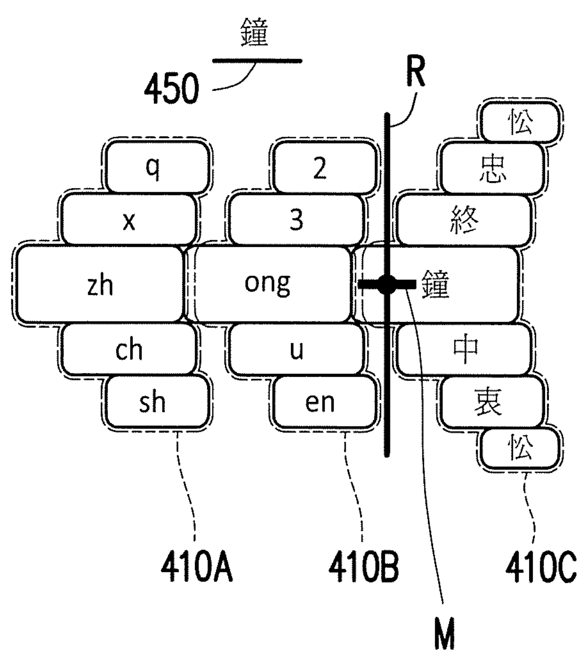

Referring next to FIG. 4D, when the processing device 110 detects that the input device 130 moves downward (i.e. the negative direction) along the first axis A1, it may control all the current candidate texts in the homonym set 410C to move downward so that the current candidate text "鐘" arranged right before (i.e. above) the originally-selected current candidate text "中" is shifted to where the indicator M is located, where the current candidate text "鐘" is set as a newly-selected current candidate text. Since the originally-selected current candidate text "中" has not yet confirmed to be an input text, the homonym "中" displayed in the input field 450 may then be replaced by "鐘".

Figure 4E:
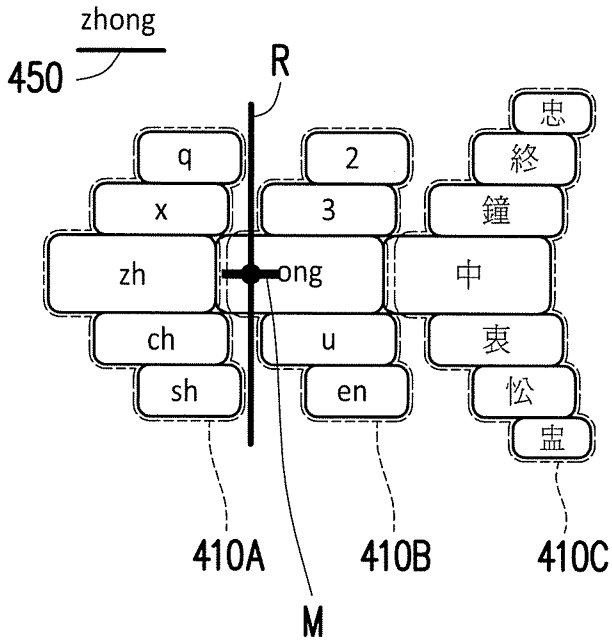

Referring next to FIG. 4E, when the processing device 110 detects that the input device 130 moves towards the right (i.e. the positive direction) along the second axis A2, it may cancel the current candidate text "鐘" selected in FIG. 4D. Meanwhile, the processing device 110 may delete the current candidate text "鐘" from the input field 450 as well as respectively shift the final set 410B arranged right before the homonym set 410C and the final "ong" back to where the reference line R and the indicator M are located. Meanwhile, the homonym "鐘" originally displayed in the input field 450 may be returned back to "zh" and "ong" as previously presented in FIG. 4B. From another perspective, the current input set is changed back to the final set 410B, and the selected current candidate text is changed back to the final "ong".

Figure 4F:
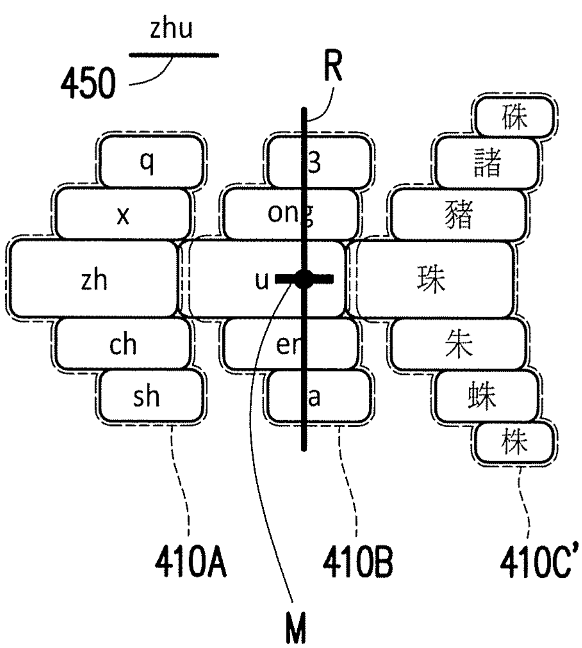

Referring next to FIG. 4F, when the processing device 110 detects that the input device 130 moves upward (i.e. the positive direction) along the first axis A1, it may control all the current candidate texts in the final set 410B to move upward so that a current candidate text "u" arranged right after (i.e. below) the originally-selected current candidate text "ong" moves upward to where the indicator M is located, where the current candidate text "u" is set as a newly-selected current candidate text. Since the originally-selected current candidate text "ong" has not yet confirmed to be an input text, the final "ong" displayed in the input field may then be replaced by "u". Due to the nature of Pinyin, since the final has been changed, the homonym set 410C may be converted to a homonym set 410C', where all candidate texts in the homonym 410C' are homonyms with "zh" as an initial and "u" as a final (e.g. "硃", "諸", "豬", "珠", "朱", "蛛", and "株").

It should be noted that, due to the limitation of the frame size, only a part of the input sets and the candidate texts may be presented on the frame in FIG. 4A-FIG. 4F. When the input sets or the candidate texts are moved, some of them which are originally-presented may possibly be displayed beyond the frame boundary (e.g. the top-left input set on the virtual keyboard), and some of them which are not originally-presented may possibly displayed on the frame to allow the user to continue the text input.

In an exemplary embodiment, to further minimize the user's interaction burden, the processing device 110 may control all the input sets to automatically and continuously move towards the negative direction along the second axis so that all the input sets arranged after the current input set may automatically and sequentially move to where the reference line is located. In such case, the user would only need to select a candidate text respectively from each of the input text. Moreover, the processing device 110 may set a moving speed of all the input sets according to a distance between the indicator and the reference line. For example, as the distance between the indicator and the reference line increases, the moving speed of the input sets may be faster. On the other hand, when any of the input sets moves to where the reference line is located, the user may control the indicator to be overlapped with the reference line so that the input sets may move extremely slowly or even stop moving, and the user may thus have sufficient time to select any of the candidate texts.

In an exemplary embodiment, the virtual keyboard may further include other options to switch to other virtual keyboards having other sets. The other virtual keyboards may include a numeric keyboard, an English keyboard, a Chinese Zhuyin keyboard, a punctuation keyboard, a symbol keyboard, and so forth. As an example in FIG. 3, other options 390 may be displayed at a third axis and not overlapped with any of the input sets. When the processing device 110 detects a third moving direction of the input device 130 with respect to the third axis, it may switch the virtual keyboard VK to a virtual keyboard associated with other sets.

Figure 5:
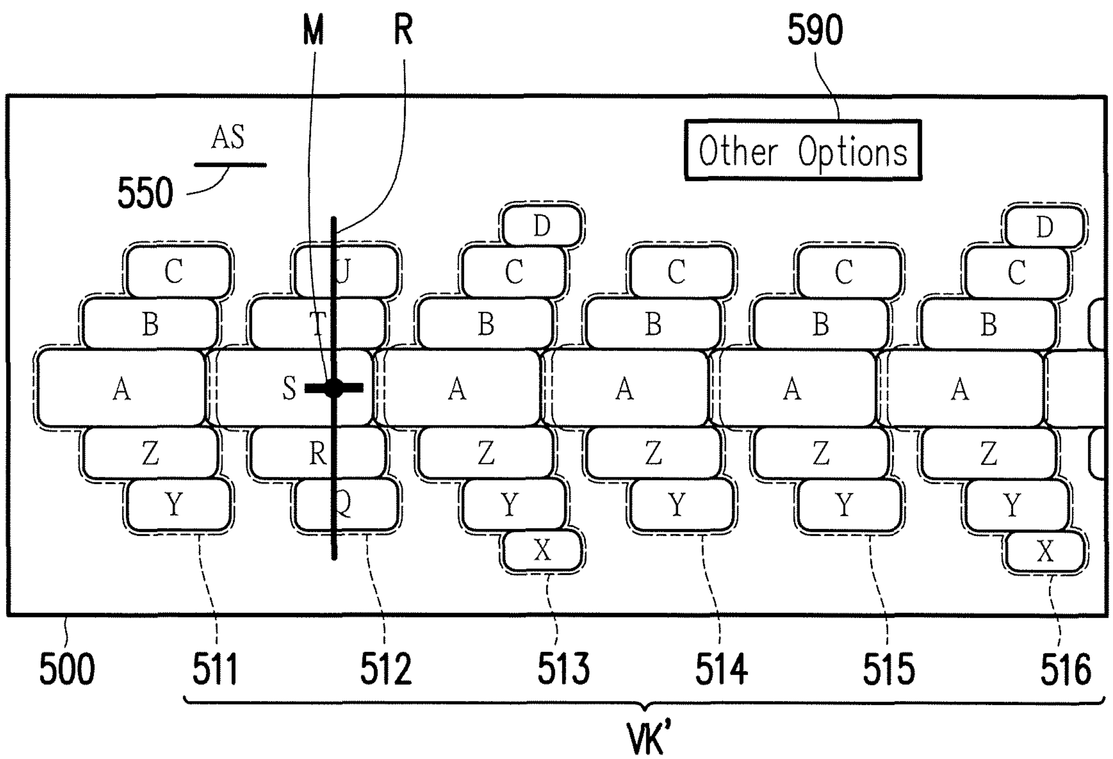
FIG. 5 illustrates a schematic diagram of a virtual keyboard in accordance with another one of the exemplary embodiments of the disclosure.

For example, FIG. 5 illustrates a schematic diagram of a virtual keyboard in accordance with another one of the exemplary embodiments of the disclosure.

Referring to FIG. 5, a virtual keyboard VK' displayed on a frame 500 is an English keyboard and includes input sets 511-516 and other options 590. The input sets 511-516 are sequentially arranged along a second axis A2 and respectively include candidate texts A-Z and a whitespace arranged along a first axis A1. The text input method of the virtual keyboard VK' may refer to the related description in the previous exemplary embodiments and will not be repeated for brevity. Due to the nature of English spelling, each of the input sets is associated with its previous input set in the exemplary embodiment. However, in other exemplary embodiment, the candidate texts in each of the input sets may be set based on the English spelling rules, and each of the input sets may then be associated with its previous input set.

In an exemplary embodiment, the processing device 110 may further allow the user to add any of the existing input sets or the existing candidate texts to the virtual keyboard to minimize the switching between different interfaces during usage. Take the Chinese keyboard in FIG. 3 as an example. The processing device 110 may allow the user to insert a punctuation set right after each of the homonym sets. The punctuation set may include commonly-used punctuation marks and a whitespace, where the whitespace represents not to input any of the punctuation marks. Take the English keyboard in FIG. 5 as an example. The processing device 110 may allow the user to insert commonly-used punctuation marks into each of the input sets to allow the user to input any of the alphabets and the punctuation marks.

The disclosure also provides a non-transitory computer readable medium, which records computer program to be loaded into a processing device of a text input system to execute the steps of the aforementioned text input method. The computer program is composed of a plurality of program instructions (for example, an organization chart, establishing program instruction, a table approving program instruction, a setting program instruction, and a deployment program instruction, etc), and these program instructions are loaded into the mobile electronic device and executed by the same to accomplish various steps of the text input method.

In view of the aforementioned descriptions, the direction-based text input method, the system, and the computer-readable recording medium using the same proposed in the disclosure generate an input text based on moving directions of the input device with respect to a first axis and a second axis. Through a two-dimensional text input approach, the disclosure may not only obviate additional design and manufacturing cost on hardware devices, but may also break the limitation of using both hands for text input so as to enhance user experience.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A direction-based text input method, applicable to a system having an input device and a display, wherein the method comprises the following steps:

displaying a virtual keyboard on a frame of the display, wherein the virtual keyboard comprises a plurality of input sets, wherein each of the input sets comprises a plurality of candidate texts, and wherein the input sets comprise a current input set having a plurality of current candidate texts, wherein the candidate texts in each of the input sets are respectively arranged along a first axis, and wherein the input sets are sequentially arranged along a second axis;

detecting a first moving direction of the input device with respect to the first axis to select one of the current candidate texts from the current candidate input set to be a selected current candidate text, wherein the first moving direction comprises a positive direction and a negative direction with respect to the first axis to select the selected current candidate text from the current candidate input set; and detecting a second moving direction of the input device with respect to the second axis to confirm that the selected current candidate text is an input text or to cancel the selected current candidate text, wherein the second moving direction comprises a positive direction and a negative direction with respect to the second axis, wherein the positive direction of the second moving direction is to cancel the selected current candidate text, and wherein the negative direction of the second moving direction is to confirm that the selected current candidate text is the input text.

2. The method according to claim 1, wherein the step of displaying the virtual keyboard on the frame of the display comprises:

displaying each of the input sets, a reference line, and an indicator on the frame, wherein the reference line is located at a fixed position and perpendicular to the second axis on the frame, wherein the current input set is located on the reference line, and wherein the indicator is located at the selected current candidate text.

3. The method according to claim 2, wherein the steps of detecting the first moving direction of the input device with respect to the first axis to select one of the current candidate texts from the current candidate input set to be the selected current candidate text and detecting the second moving direction of the input device with respect to the second axis to confirm that the selected current candidate text is the input text or to cancel the selected current candidate text comprise:

when the first moving direction of the input device with respect to the first axis is detected, controlling the current candidate texts to move so that another current candidate text among the current candidate texts is located at the indicator and updating the selected current candidate text to the another current candidate text; and when the second moving direction of the input device with respect to the second axis is detected, confirming that the selected current candidate text is the input text or cancelling the selected current candidate text.

4. The method according to claim 3, wherein when the first moving direction of the input device with respect to the first axis is detected, the step of controlling the current candidate texts to move so that the another current candidate text among the current candidate texts is located at the indicator comprises:

when the first moving direction of the input device is detected to be the positive direction, controlling the current candidate texts to move towards the positive direction so that the current candidate text arranged right after the selected current candidate text is located at the indicator; and when the first moving direction of the input device is detected to be the negative direction, controlling the current candidate texts to move towards the negative direction so that the current candidate text arranged right before the selected current candidate text is located at the indicator.

5. The method according to claim 3 further comprising:

displaying the selected current candidate text on the frame; and when the selected current candidate text is updated to the another current candidate text, updating the selected current candidate text displayed on the frame to the another current candidate text.

6. The method according to claim 3, wherein when the second moving direction of the input device with respect to the second axis is detected, the step of confirming that the selected current candidate text is the input text or cancelling the selected current candidate text comprises:

when the second moving direction of the input device is detected to be the negative direction, setting the selected current candidate text as the input text and controlling each of the input sets to move towards the negative direction so that the current candidate text arranged right after the selected current candidate text is located on the reference line; and when the second moving direction of the input device is detected to be the positive direction, cancelling the selected current candidate text and controlling each of the input sets to move towards the positive direction so that the current candidate text arranged right before the selected current candidate text is located on the reference line.

7. The method according to claim 3 further comprising:

displaying the selected current candidate text on the frame; and when the selected current candidate text is canceled, deleting the selected current candidate text from the frame.

8. The method according to claim 2, wherein the virtual keyboard is a Chinese keyboard, wherein the input sets comprise an initial set, a final set, and a homonym set sequentially arranged along the first axis, wherein the initial set comprises a plurality of initials and a zero initial, and wherein the final set comprises a plurality of finals, a plurality of tones, and a combination thereof.

9. The method according to claim 8, wherein an initial input text associated with the initial set and a final input text associated with the final set are display on the frame, and wherein when the selected current candidate text is associated with any homonym in the homonym set, the method further comprising:

converting the initial input text and the final input text displayed on the frame to the any homonym.

10. The method according to claim 9, wherein when the second moving direction is associated with the cancellation of the selected current candidate text, the method further comprising:

converting the any homonym displayed on the screen to the initial input text and the final input text.

11. The method according to claim 2, wherein the virtual keyboard is an English keyboard, and wherein each of the input sets respectively comprises all English alphabets and a white space.

12. The method according to claim 1, wherein the virtual keyboard further comprises an option associated with at least one other set, wherein the option is not overlapped with the input sets and is located at a third axis, and wherein the method further comprises:

detecting a third moving direction of the input device with respect to the third axis so as to accordingly switch the virtual keyboard to a virtual keyboard associated with the at least one other set.

13. The method according to claim 2, wherein after the step of displaying the virtual keyboard on the frame of the display, the method further comprising:

controlling each of the input sets to continuously move towards a negative direction of the second axis so that each of the input sets arranged after the current input set sequentially moves to the reference line.

14. The method according to claim 13, wherein when a distance between the indicator and the reference line becomes larger, each of the input sets moves faster.

15. A text input system comprising:

a display;

an input device; and a processing device, connected to the display and the input device, and configured to:

display a virtual keyboard on a frame of the display, wherein the virtual keyboard comprises a plurality of input sets, wherein each of the input sets comprises a plurality of candidate texts, and wherein the input sets comprise a current input set having a plurality of current candidate texts, wherein the candidate texts in each of the input sets are respectively arranged along a first axis, and wherein the input sets are sequentially arranged along a second axis;

detect a first moving direction of the input device with respect to the first axis to select one of the current candidate texts from the current candidate input set to be a selected current candidate text, wherein the first moving direction comprises a positive direction and a negative direction with respect to the first axis to select the selected current candidate text from the current candidate input set; and detect a second moving direction of the input device with respect to the second axis to confirm that the selected current candidate text is an input text or to cancel the selected current candidate text, wherein the second moving direction comprises a positive direction and a negative direction with respect to the second axis, wherein the positive direction of the second moving direction is to cancel the selected current candidate text, and wherein the negative direction of the second moving direction is to confirm that the selected current candidate text is the input text.

16. The text input system according to claim 15, wherein the processing device displays each of the input sets, a reference line, and an indicator on the frame, wherein the reference line is located at a fixed position and perpendicular to the second axis on the frame, wherein the current input set is located on the reference line, and wherein the indicator is located at the selected current candidate text.

17. The text input system according to claim 16, wherein:

when the first moving direction of the input device with respect to the first axis is detected, the processing device controls the current candidate texts to move so that another current candidate text among the current candidate texts is located at the indicator and updates the selected current candidate text to the another current candidate text; and when the second moving direction of the input device with respect to the second axis is detected, the processing device confirms that the selected current candidate text is the input text or cancels the selected current candidate text.

18. The text input system according to claim 17, wherein:

when the first moving direction of the input device is detected to be the positive direction, the processing device controls the current candidate texts to move towards the positive direction so that the current candidate text arranged right after the selected current candidate text is located at the indicator; and when the first moving direction of the input device is detected to be the negative direction, the processing device controls the current candidate texts to move towards the negative direction so that the current candidate text arranged right before the selected current candidate text is located at the indicator.

19. The text input system according to claim 17, wherein the processing device further displays the selected current candidate text on the frame, and wherein when the processing device updates the selected current candidate text to the another current candidate text, the processing device updates the selected current candidate text displayed on the frame to the another current candidate text.

20. The text input system according to claim 17, wherein:

when the second moving direction of the input device is detected to be the negative direction, the processing device sets the selected current candidate text as the input text and controls each of the input sets to move towards the negative direction so that the current candidate text arranged right after the selected current candidate text is located on the reference line; and when the second moving direction of the input device is detected to be the positive direction, the processing device cancels the selected current candidate text and controls each of the input sets to move towards the positive direction so that the current candidate text arranged right before the selected current candidate text is located on the reference line.

21. The text input system according to claim 17, wherein the processing device further displays the selected current candidate text on the frame, and wherein when the processing device cancels the selected current candidate text, the processing device deletes the selected current candidate text from the frame.

22. The text input system according to claim 16, wherein the virtual keyboard is a Chinese keyboard, wherein the input sets comprise an initial set, a final set, and a homonym set sequentially arranged along the first axis, wherein the initial set comprises a plurality of initials and a zero initial, and wherein the final set comprises a plurality of finals, a plurality of tones, and a combination thereof.

23. The text input system according to claim 22, wherein the processing device further displays an initial input text associated with the initial set and a final input text associated with the final set on the frame, and wherein when the selected current candidate text is associated with any homonym in the homonym set, the processing device further converts the initial input text and the final input text displayed on the frame to the any homonym.

24. The text input system according to claim 23, wherein when the second moving direction is associated with the cancellation of the selected current candidate text, the processing device further converts the any homonym displayed on the screen to the initial input text and the final input text.

25. The text input system according to claim 16, wherein the virtual keyboard is an English keyboard, and wherein each of the input sets respectively comprises all English alphabets and a white space.

26. The text input system according to claim 15, wherein the virtual keyboard further comprises an option associated with at least one other set, wherein the option does not overlap with the input sets and is located at a third axis, and wherein the processing device further detects a third moving direction of the input device with respect to the third axis so as to accordingly switch the virtual keyboard to a virtual keyboard associated with the at least one other set.

27. The text input system according to claim 16, wherein the processing device further control each of the input sets to continuously move towards a negative direction of the second axis so that each of the input sets arranged after the current input set sequentially moves to the reference line.

28. The text input system according to claim 27, wherein when a distance between the indicator and the reference line becomes larger, each of the input sets moves faster.

29. A non-transitory computer-readable recording medium, recording programs to be loaded into a processing device of a text input system to perform steps of:

displaying a virtual keyboard on a frame of the display, wherein the virtual keyboard comprises a plurality of input sets, wherein each of the input sets comprises a plurality of candidate texts, and wherein the input sets comprise a current input set having a plurality of current candidate texts, wherein the candidate texts in each of the input sets are respectively arranged along a first axis, and wherein the input sets are sequentially arranged along a second axis;

detecting a first moving direction of the input device with respect to the first axis to select one of the current candidate texts from the current candidate input set to be a selected current candidate text, wherein the first moving direction comprises a positive direction and a negative direction with respect to the first axis to select the selected current candidate text from the current candidate input set; and detecting a second moving direction of the input device with respect to the second axis to confirm that the selected current candidate text is an input text or to cancel the selected current candidate text, wherein the second moving direction comprises a positive direction and a negative direction with respect to the second axis, wherein the positive direction of the second moving direction is to cancel the selected current candidate text, and wherein the negative direction of the second moving direction is to confirm that the selected current candidate text is the input text.

* * * * *